United States Patent
Mostafa et al.

(10) Patent No.: US 12,432,592 B2
(45) Date of Patent: Sep. 30, 2025

(54) MEASUREMENT REPORT BASED RADIO LINK FAILURE DETECTION

(71) Applicant: Apple Inc., Cupertino, CA (US)

(72) Inventors: Amr Y. Mostafa, Munich (DE); Shadi Iskander, Ergolding (DE); Tamer Adel Darweesh Hassan Darweesh, Munich (DE)

(73) Assignee: Apple Inc., Cupertino, CA (US)

( * ) Notice: Subject to any disclaimer, the term of this patent is extended or adjusted under 35 U.S.C. 154(b) by 594 days.

(21) Appl. No.: 17/696,460

(22) Filed: Mar. 16, 2022

(65) Prior Publication Data

US 2022/0322125 A1 Oct. 6, 2022

Related U.S. Application Data

(60) Provisional application No. 63/170,982, filed on Apr. 5, 2021.

(51) Int. Cl.
*H04W 24/10* (2009.01)
*H04W 76/19* (2018.01)

(52) U.S. Cl.
CPC .......... *H04W 24/10* (2013.01); *H04W 76/19* (2018.02)

(58) Field of Classification Search
CPC ..... H04W 24/10; H04W 76/19; H04W 24/04; H04W 24/08
See application file for complete search history.

(56) References Cited

U.S. PATENT DOCUMENTS

| | | | |
|---|---|---|---|
| 2016/0007252 A1* | 1/2016 | Larmo | H04W 76/28 370/332 |
| 2016/0112924 A1* | 4/2016 | Turakhia | H04W 36/305 370/332 |
| 2016/0285679 A1* | 9/2016 | Dudda | H04W 36/0058 |
| 2017/0048898 A1 | 2/2017 | Jung et al. | |
| 2019/0182689 A1* | 6/2019 | Martin | H04W 76/19 |
| 2021/0022055 A1* | 1/2021 | Tseng | H04W 36/362 |
| 2021/0058834 A1 | 2/2021 | Paladugu et al. | |
| 2022/0038968 A1* | 2/2022 | Latheef | H04W 24/10 |

FOREIGN PATENT DOCUMENTS

| | | |
|---|---|---|
| CN | 101478816 A | 7/2009 |
| CN | 110679101 A | 1/2020 |
| CN | 111886891 A | 11/2020 |
| CN | 112584552 A * | 3/2021 |
| WO | 2016061390 A1 | 4/2016 |

OTHER PUBLICATIONS

European Patent Application No. 22165939.4, Extended European Search Report, Aug. 12, 2022, 10 pages.

(Continued)

*Primary Examiner* — Chuong M Nguyen
(74) *Attorney, Agent, or Firm* — Kilpatrick Townsend & Stockton LLP

(57) ABSTRACT

The present application relates to devices and components including apparatus, systems, and methods for user equipments re-triggering measurement reports during radio link failure detection.

20 Claims, 6 Drawing Sheets

(56) References Cited

OTHER PUBLICATIONS

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
European Patent Application No. 22165939.4, Office Action, Mar. 25, 2025, 7 pages.
3GPP TS 36.331 version 8.5.0 Release 8, LTE; Evolved Universal Terrestrial Radio Access (E-UTRA); Radio Resource Control (RRC); Protocol specification, Apr. 2009, 205 pages.
China Patent Application No. 202210348918.X, Office Action, May 29, 2025, 16 pages.

* cited by examiner

400 

```
┌─────────────────────────────────────┐
│ Detecting a predetermined number of │
│       consecutive out-of-sync       │
│             indications             │
│                 404                 │
└─────────────────────────────────────┘
                  │
                  ▼
┌─────────────────────────────────────┐
│ Transmitting a first measurement    │
│ report transmission for a           │
│ measurement identity during said    │
│ detecting of the predetermined      │
│ number of consecutive out-of-sync   │
│ indications                         │
│                 408                 │
└─────────────────────────────────────┘
                  │
                  ▼
┌─────────────────────────────────────┐
│ Starting T310 timer based on        │
│ detecting the predetermined number  │
│ of consecutive out-of-sync          │
│ indications                         │
│                 412                 │
└─────────────────────────────────────┘
                  │
                  ▼
┌─────────────────────────────────────┐
│ Transmitting a second measurement   │
│ report transmission for the         │
│ measurement identity based on said  │
│ detecting of the predetermined      │
│ number of consecutive out-of-sync   │
│ indications                         │
│                 416                 │
└─────────────────────────────────────┘
```

FIG. 4

500

Starting a timer based on predetermined number of consecutive out-of-sync indications
504

Detecting a first measurement report transmission was transmitted during period of time before starting the timer
508

Transmitting a second measurement report transmission for the measurement identity based on said detecting that the first measurement report transmission was transmitted during the period of time
512

FIG. 5

MEASUREMENT REPORT BASED RADIO LINK FAILURE DETECTION

CROSS-REFERENCES TO RELATED APPLICATIONS

This application claims the benefit of U.S. Provisional Patent Application No. 63/170,982, filed Apr. 5, 2021. The disclosure of this application is incorporated by reference herein in its entirety.

BACKGROUND

Third Generation Partnership Project (3GPP) defines a number of reference signals to facilitate communications in a wireless access cell. A base station may configure a user equipment (UE) to perform and report measurements on these reference signals in order to detect a radio link failure.

BRIEF DESCRIPTION OF THE DRAWINGS

FIG. 4 illustrates an operational flow/algorithmic structure in accordance with some embodiments.

FIG. 5 illustrates another operational flow/algorithmic structure in accordance with some embodiments.

DETAILED DESCRIPTION

Figure 1:
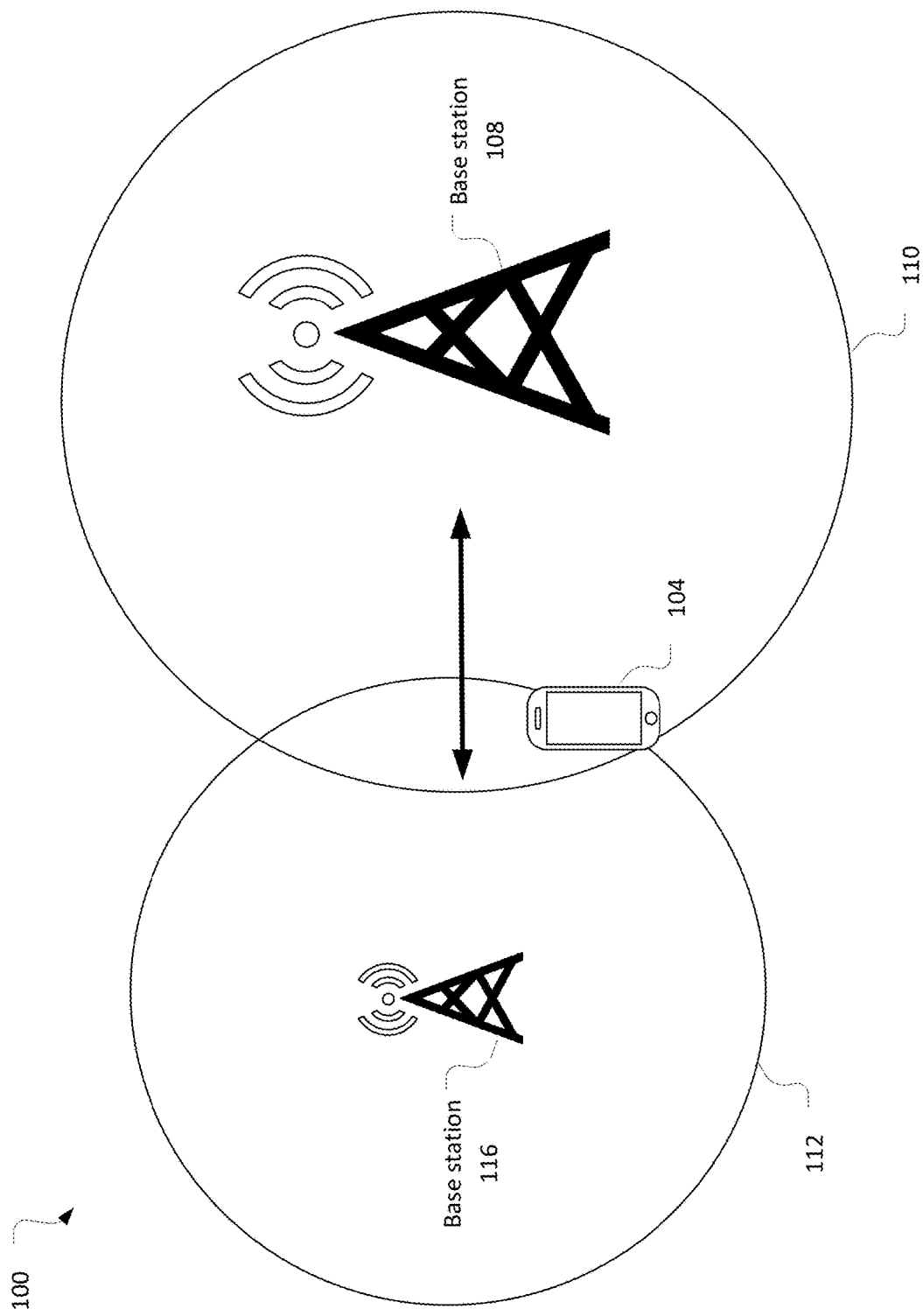
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide a serving cell 110 through which the UE 104 may communicate with the base station 108. In some embodiments, the base station 108 is a next-generation node B (gNB) that provides 3GPP New Radio (NR) cell. In other embodiments, the base station 108 is an evolved node B (eNB) that provides a Long Term Evolution (LTE) cell. The air interface over which the UE 104 and base station 108 communicate may be compatible with 3GPP technical specifications such as those that define Fifth Generation (5G) NR system standards.

The network environment 100 may further include a neighbor cell 112 provided by base station 116. The base station 116 may use the same radio access technology as the base station 108 or a different radio access technology.

To adapt to changes in a radio environment and relative positioning between the UE 104 and the base stations, the UE 104 may be configured to perform a variety of measurements on reference signals transmitted in the serving cell 110 or the neighbor cell 112. The base station 108 may transmit a measurement configuration to provide the UE 104 with information to perform the reference signal measurements.

The measurement configuration may instruct the UE 104 to perform intra-frequency, inter-frequency, or inter-system measurements based on reference signals that include, for example, synchronization signal and physical broadcast channel blocks (SSB) or channel state information-reference signal (CSI-RS) resources. The measurements may be beam-level or cell-level. SSB intra-frequency measurements may correspond to situations in which both the serving cell 110 and the neighbor cell 112 use the same SSB center frequency and subcarrier spacing. The CSI-RS intra-frequency measurements may correspond to situations in which the neighbor cell 112 is configured with a CSI-RS resource bandwidth that is confined within a bandwidth of the CSI-RS resource belonging to the serving cell 110, and both CSI-RSs use the same subcarrier spacing. Inter-system measurements may be performed in the event the serving cell 110 is an NR cell and the neighbor cell 112 is an LTE cell, or vice versa.

The measurement configuration may be transmitted to the UE 104 while the UE 104 is in a radio resource control (RRC)-connected mode by dedicated signaling such as RRC signaling (for example, an RRC reconfiguration message or RRC resume message).

In some embodiments, a measurement configuration may include (directly or by reference) a measurement identity, a measurement object, and a reporting configuration. The measurement identity may link a reporting configuration to a measurement object. The measurement identity may include a first pointer toward a reporting configuration and a second pointer toward a measurement object. The UE 104 may provide measurement results within an RRC message (for example, an RRC measurement report) that includes the measurement ID as a reference.

The measurement object may provide information about SSBs and CSI-RS resources that are to be measured.

The reporting configuration may provide a periodic, event-triggered, or cell global identity (CGI) configuration. The reporting configuration may include parameters such as report amount, reporting interval, and, if the configuration is an event-triggered configuration, a measurement reporting event. The report amount and reporting interval may be abstract syntax notation one (ASN.1) fields in a report configuration information element (IE). The report amount may describe how many times a measurement report is to be transmitted based on a triggering event. The triggering event may be a period elapsing (for a periodic configuration) or a triggering condition of a measurement reporting event being satisfied (for an event-triggered configuration). The reporting interval may provide a time between successive transmissions of the measurement report. The reporting configuration may further describe the reference signal type (for example, SS-PBCH or CSI-RS) that may be used for the periodic or event-triggered configurations.

A physical (PHY) layer of the UE 104, which may also be referred to as Layer 1 (L1), may keep track of radio channel quality by performing measurements on the reference signals based on the measurement configuration. The PHY layer may measure reference signals and generate out-of-sync or in-sync indications based on comparing the measurements to various quality levels. For example, the UE 104 may generate out-of-sync indications if all reference signals of a measurement period are below a first quality level (Qout) at which the radio link is considered unreliable, which may be based on an out-of-sync block error ratio (BLER) value of a hypothetical physical downlink control channel (PDCCH) transmission; and generate an in-sync indication if at least one reference signal of the measurement period exceeds a second quality level (Qin) at which the radio link is considered reliable, which may be based on an in-sync BLER value of the hypothetical PDCCH transmission. The measurement period may have a periodicity referred to as an in-sync/out-of-sync (IS/OOS) periodicity. In some embodiments, the out-of-sync BLER may be set at 10% and the in-sync BLER may be set at 2%.

The PHY layer may provide the out-of-sync and in-sync indications to an RRC layer of the UE 104. The RRC layer may determine whether a radio link failure (RLF) occurs based on receipt of the indications and values of counters and timer. For example, the RRC layer may start a timer, T310, if the RRC layer receives N310 consecutive out-of-sync indications and may stop and reset T310 if the RRC layer receives N311 consecutive in-sync indications. If T310 expires, the RRC layer may declare an RLF and initiate an RLF recovery procedure (for example, a connection reestablishment procedure). During the period of bad radio conditions, starting from the first out-of-sync indication until expiration of the T310 timer, there is an increased risk that uplink data transmitted from the UE 104 (for example, measurement reports) and downlink data transmitted by the base station 108 (for example, handover commands) may not be successfully delivered.

Figure 2:
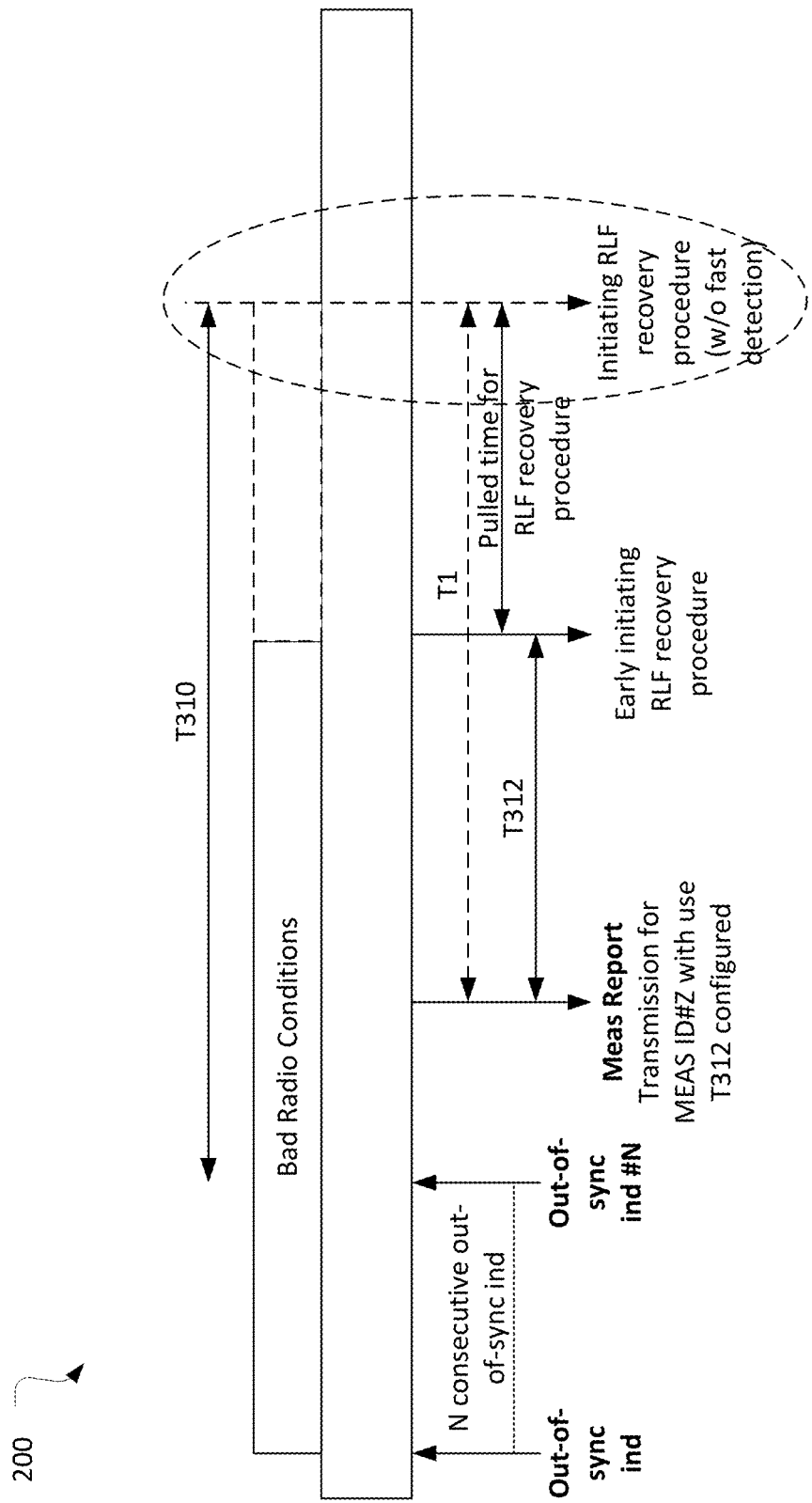
FIG. 2 illustrates a fast radio link failure detection to describe aspects of some embodiments.

FIG. 2 illustrates a fast RLF detection 200 to describe aspects of embodiments. The base station 108 may configure the UE 104 with a measurement ID that is associated with a T312 configuration (for example, the measurement ID is associated with a reporting configuration having a T312 field set to true). After the physical layer problem is detected (for example, after N310 (or simply "N") consecutive out-of-sync physical layer indications) and T310 is started, if the UE 104 transmits a measurement report on one of the measurement IDs associated with a T312 configuration (for example, MEAS ID #Z in FIG. 2), the UE 104 may start a T312 timer with a value configured by the base station 108. This value may correspond to a guard time to secure a successful transmission for the measurement report and successful reception of a corresponding network response, for example, a handover command.

If the T312 timer expires before the T310 timer, the UE 104 may consider that event an early detection of an RLF, and the RRC layer may initiate an RLF recovery procedure. In this instance, the RLF recovery procedure may be initiated in advance of a standard RLF recovery procedure (based on the T310 timer) by an amount indicated in FIG. 2 as pulled time for RLF recovery procedure. This may prevent the UE 104 from unnecessarily waiting T1 time from the measurement report transmission for the T310 timer to expire. Maintaining the radio link for this extended period of time may be problematic given that the poor radio conditions may result in the UE 104 being unable to receive further communication from the base station 108 (for example, a handover command).

The fast detection of FIG. 2 provides improvement in the case in which the measurement report was transmitted while the T310 timer is running. However, this may not help in some situations in which the measurement report is transmitted during poor radio conditions, but before starting the T310 timer. Transmitting the measurement report in these poor radio conditions may result in unsuccessful transmission of the measurement report or receipt of the handover command.

The fast detection depicted in FIG. 2 may not be available for three cases in which a measurement report is transmitted during the time period in which the consecutive out-of-sync indications are being detected, but before the T310 timer is started (for example, before N310 consecutive indications have been reached).

A first case may occur when parameters of the reporting configuration associated with the measurement ID (for example, the report amounts or report interval in the report configuration IE) do not allow another transmission of the measurement report. This may be the case if a maximum number of measurement reports for this measurement ID is set to one (for example, the report amount field includes a value of one); or if a maximum number of measurement reports allowed to be transmitted on this measurement ID (for example, based on a value of the report amount field) has been reached. In this situation, the transmission of the measurement report that occurs before the T310 timer was running would exhaust the number of times the measurement report can be transmitted. The measurement report would not be transmitted again while the T310 timer was running and, therefore, the T312 timer would not be triggered or allow for fast RLF detection as depicted in FIG. 2.

A second case may occur when the reporting configuration associated with the measurement ID is associated with a large report interval value (as configured through report interval field of the report configuration IE) that would lead to re-triggering of the measurement report after expiration of the T310 timer. Similar to the first case, in this situation, the measurement report would not be transmitted again while the T310 timer was running and, therefore, the T312 timer would not be triggered or allow for fast RLF detection as depicted in FIG. 2.

A third case may occur when the reporting configuration associated with the measurement ID includes a large report interval value (as configured through report interval field of the report configuration IE) that would lead to re-triggering of the measurement report within the T310 duration but shortly before its expiration. For example, if the report interval retriggers the measurement report at a time in which the associated T312 timer would expire after the T310 timer expires, there would be no opportunity for the fast RLF detection as depicted in FIG. 2.

Embodiments describe re-triggering transmission of measurement reports for measurement IDs associated with T312 configuration upon starting the T310 timer. The retransmitted measurement reports may include the latest measurements for detected cells from a physical layer of the UE. In some embodiments, the re-triggering may be performed with respect to measurement events with a satisfied trigger condition independent of a measurement ID's number of transmitted measurement reports, report interval network configuration (for example, report interval), or maximum allowed reports network configuration (for example, report amount). The retransmission of the measurement reports may be used for any type of measurement events including, for example, Event A2, Event A3, Event A5, and Event B2. These measurement events may be based on measurements taken with respect to serving cells (for example, serving cell 110) and neighbor cells (for example, neighbor cell 112). The measurements may measure reference signal receive power (RSRP) value, reference signal receive quality (RSRQ), or signal-to-interference-plus-noise ratio (SINR).

Event A2 may be triggered when a serving cell measurement becomes worse than a threshold. The threshold may be a value configured by the network and may depend on the type of serving cell measurement. Event A2 may be used to trigger a mobility procedure when the UE 104 moves toward a cell edge.

Event A3 may be triggered when a neighbor cell measurement becomes better than a special cell measurement by an offset. The special cell may be a primary serving cell of a master cell group (MCG) or a secondary cell group (SCG).

The offset may be positive or negative. Event A3 may be used for intra-frequency or inter-frequency handover procedures.

Event A5 may be triggered when a special cell measurement becomes worse than the first threshold, while a neighbor cell measurement becomes greater than a second threshold. Event A5 may be used for intra-frequency or inter-frequency handover procedures.

Event B2 may be triggered when a primary serving cell measurement becomes worse than a first threshold, while a neighbor inter-system cell measurement becomes better than a second threshold. Event B2 may be used to trigger inter-system mobility procedures when a signal of the primary serving cell deteriorates.

Figure 3:
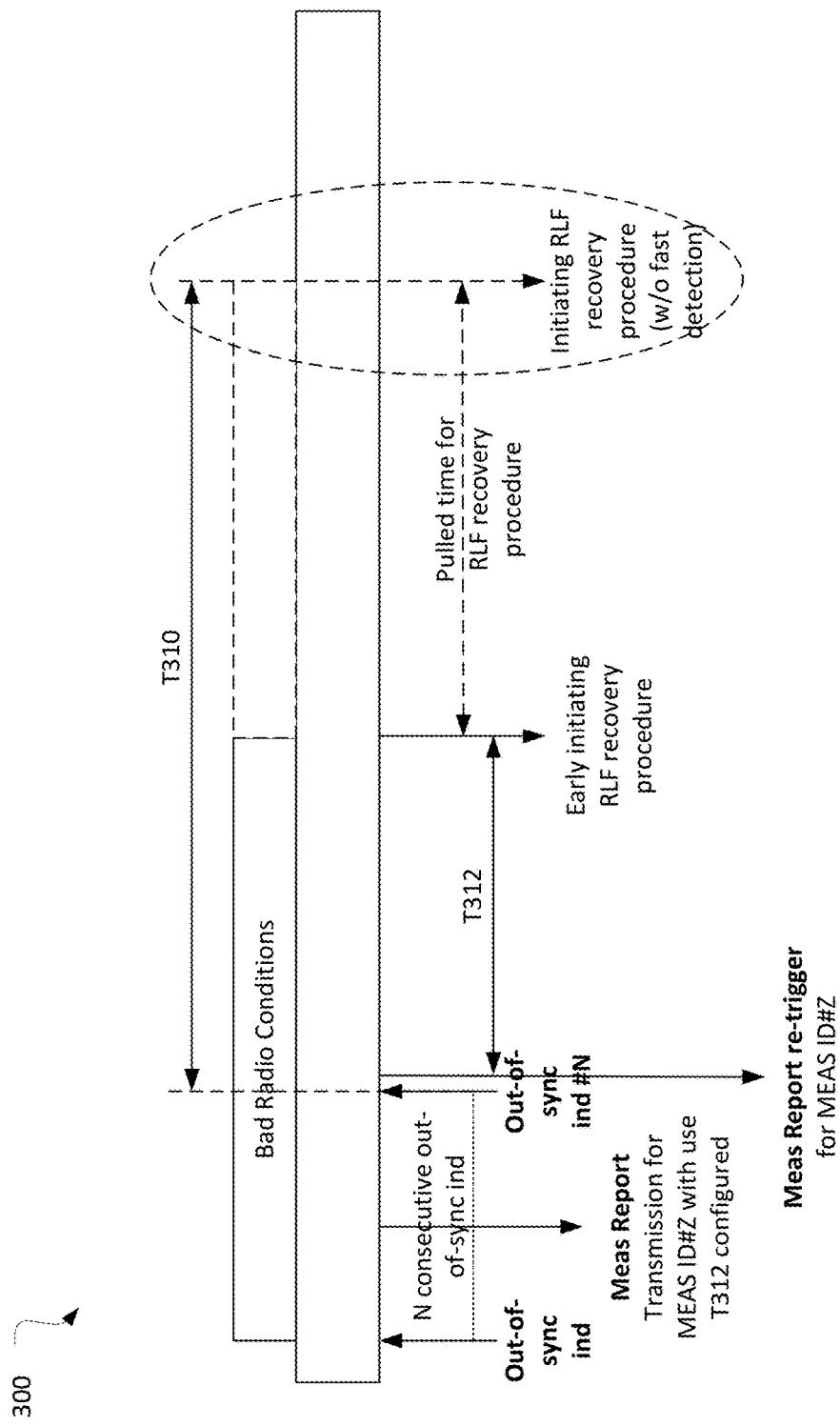
FIG. 3 illustrates a fast radio link failure detection in accordance with some embodiments.

FIG. 3 illustrates a fast RLF detection 300 in accordance with some embodiments. In this embodiment, a measurement report may be transmitted for measurement ID #Z while the physical layer is detecting the N consecutive out-of-sync indications. After detecting the Nth out-of-sync indication, the T310 timer may be triggered and another transmission of the measurement report may also be triggered. The re-triggering of the measurement report transmission may be independent of configuration parameters that would otherwise prevent another transmission of the measurement report. As described above, these configuration parameters may include a report interval network configuration or a maximum allowed reports network configuration.

The re-triggering of the measurement report for measurement ID #Z while the T310 timer is running may also start the associated T312 timer. The T312 timer expiration may correspond to the fast RLF detection, after which the UE may engage in an early initiation of the RLF recovery procedure.

Re-triggering transmission of measurement reports for measurement IDs, as described above, may include at least two advantages. A first advantage may be that the re-triggered measurement report transmission may update the network with latest measurement (for example, power) values for serving/neighbor cells. This may be useful in the event that measurement (for example, power) values of the previously transmitted measurement report were not good enough to initiate handover procedure for the UE 104. This advantage may apply equally well to embodiments in which the measurement ID is associated with a T312 configuration and embodiments in which the measurement ID is not associated with a T312 configuration. A second advantage may be that the UE 104 may start the T312 timer in order to allow early recovery from bad radio conditions by quickly instituting the RLF recovery procedure.

In some embodiments, the UE 104 may utilize the re-triggering of the measurement report as described above with respect to FIG. 3 if the measurement ID is associated with a measurement event condition that indicates a quality neighbor cell measurement. For example, Event A3, Event A4, Event A5, and Event B2 are all associated with a neighbor cell measurement being above a certain threshold. This may avoid triggering an early RLF recovery procedure in temporary out-of-coverage scenarios (for example, entering an elevator) in which the UE 104 would face bad radio conditions on all radio channels.

While the above embodiment describes the re-triggering of the measurement report for measurement IDs associated with a T312 configuration, other embodiments may utilize the re-triggering of the measurement report for other (or even all) measurement IDs. As mentioned above, this may help, for example, in a scenario in which a retransmission of the measurement report provides updated measurement values that may be useful in handover conditions.

FIG. 4 illustrates an operation flow/algorithmic structure 400 in accordance with some aspects. The operation flow/algorithmic structure 400 may be performed or implemented by a UE, such as UE 104 or 600; or components thereof, for example, baseband processor 604A.

The operation flow/algorithmic structure 400 may include, at 404, detecting a predetermined number of consecutive out-of-sync indications. The predetermined number may be N310 (or "N"). The UE may determine this value based on a specific configuration from the gNB in, for example, an rif-Timersand Constants, a UE-TimersandConstants portion of a system information block one (SIB 1), or by some other method.

The operation flow/algorithmic structure 400 may further include, at 408, transmitting a first measurement report transmission for a measurement identity during said detecting of the predetermined number of consecutive out-of-sync indications. The measurement ID may be associated with the event-triggered reporting configuration that includes a measurement reporting event. The UE may determine that a triggering condition of the reporting event is satisfied and may transmit the first measurement report transmission based on this determination. As discussed above, the triggering condition may be based on measurements of the serving cell or neighboring cell.

Given that the first measurement report transmission is done during the period of detecting the number of consecutive out-of-sync indications, it will also be transmitted during poor or otherwise compromised radio conditions that immediately precede the start of the T310 timer.

The operation flow/algorithmic structure 400 may further include, at 412, starting a T310 timer based on detecting the predetermined number of consecutive out-of-sync indications.

The operation flow/algorithmic structure 400 may further include, at 416, transmitting a second measurement report transmission for the measurement identity based on detecting the predetermined number of consecutive out-of-sync indications. The second measurement report transmission may be independent of configuration parameters that may otherwise prevent the transmission. For example, the second measurement report transmission may be transmitted regardless of whether the report number is one or any other number that matches a number of previous measurement report transmissions (for example, the report number is X and the first measurement report transmission transmitted at 408 was the Xth transmission). For another example, the second measurement report transmission may be transmitted regardless of whether a configured report interval has been met. For example, if the reporting interval is 120 ms and the first measurement report transmission was transmitted 20 ms before starting the T310 timer, the UE will not wait the additional 100 ms indicated by the reporting interval for transmission of the second measurement report transmission. Rather, the second measurement report transmission will be transmitted after starting the T310 timer without delay.

Transmitting the second measurement report transmission based on detection of the predetermined number may include transmitting the second measurement report transmission based on starting the T310 timer, given that starting the T310 timer is also based on the detection of the predetermined number.

In some embodiments, the second measurement report transmission may be transmitted further based on determining that a trigger condition of a measurement reporting event is still satisfied.

In some embodiments, only selected measurement reports may be transmitted based on detection of the predetermined number of out-of-sync indications. For example, in some embodiments, only measurement reports associated with a measurement ID having a T312 configuration may be re-triggered as described herein. For another example, in some embodiments, only measurement reports associated with a measurement event having a triggering condition that indicates that a neighboring cell measurement is above a threshold may be re-triggered as described herein. In other embodiments, other measurement reports may be re-triggered.

FIG. 5 illustrates an operation flow/algorithmic structure 500 in accordance with some aspects. The operation flow/algorithmic structure 500 may be performed or implemented by a UE such as, for example, UE 104 or 600; or components thereof, for example, baseband processor 604A.

The operation flow/algorithmic structure 500 may include, at 504, starting a timer based on detecting a predetermined number of consecutive out-of-sync indications. The timer may be a T310 timer. In some embodiments, an RRC layer of the UE may start the timer based on N consecutive out-of-sync indications provided by a PHY layer of the UE.

The operation flow/algorithmic structure 500 may further include, at 508, detecting that a first measurement report transmission was transmitted before starting the timer. In some embodiments, the measurement report may be transmitted in a period of poor radio conditions, which could be, for example, the time in which the N consecutive out-of-sync indications were detected/received. However, embodiments may apply to all event-based measurement reports transmitted before starting the timer as long as the reporting conditions of the measurement ID are still fulfilled.

The operation flow/algorithmic structure 500 may further include, at 512, transmitting a second measurement report transmission for the measurement identity based on said detecting that the first measurement report was transmitted before starting the timer. Similar to the discussion above with respect to FIG. 4, the second measurement report transmission may be independent of configuration parameters that may otherwise prevent the transmission.

In some embodiments, only selected measurement reports may be transmitted based on detection of the predetermined number of out-of-sync indications. For example, in some embodiments, only measurement reports associated with a measurement ID having a T312 configuration may be re-triggered as described herein. For another example, in some embodiments, only measurement reports associated with a measurement event having a triggering condition that indicates a neighboring cell measurement is above a threshold may be re-triggered as described herein. In other embodiments, other measurement reports may be re-triggered.

Figure 6:
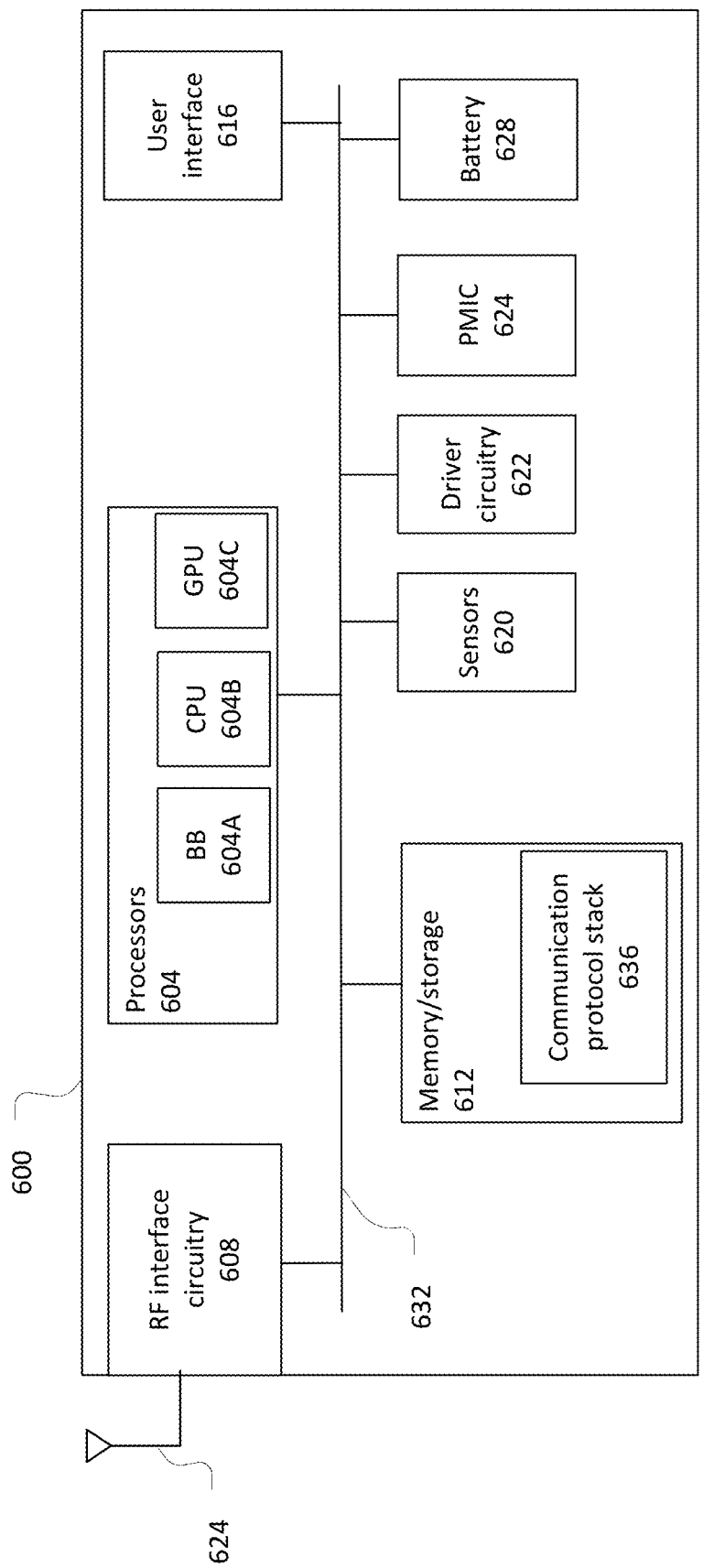
FIG. 6 illustrates a user equipment in accordance with some embodiments.

FIG. 6 illustrates a UE 600 in accordance with some aspects. The UE 600 may be similar to and substantially interchangeable with UE 104.

The UE 600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 600 may include processors 604, RF interface circuitry 608, memory/storage 612, user interface 616, sensors 620, driver circuitry 622, power management integrated circuit (PMIC) 624, antenna structure 626, and battery 628. The components of the UE 600 may be implemented as integrated circuits (ICs), portions thereof, discrete electronic devices, or other modules, logic, hardware, software, firmware, or a combination thereof. The block diagram of FIG. 6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, optical connection, etc. that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein.

In some aspects, the baseband processor circuitry 604A may access a communication protocol stack 636 in the memory/storage 612 to communicate over a 3GPP compatible network. In general, the baseband processor circuitry 604A may access the communication protocol stack 636 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 608.

The baseband processor circuitry 604A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 may also store information related to RLF detection and recovery (for example, RLF timer and constant values) and re-triggering measurement reports as described elsewhere.

The memory/storage 612 include any type of volatile or non-volatile memory that may be distributed throughout the UE 600. In some aspects, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random-access memory (DRAM), static random-access memory (SRAM), erasable programmable read-only memory (EPROM), electrically erasable programmable read only memory (EEPROM), Flash memory, solid-state memory, or any other type of memory device technology.

The RF interface circuitry 608 may include transceiver circuitry and radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 626 and proceed to filter and amplify the signal with a low-noise amplifier. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various aspects, the RF interface circuitry 608 may be configured to transmit/receive signals in a manner compatible with NR access technologies.

The antenna 626 may include antenna elements to convert electrical signals into radio waves to travel through the air and to convert received radio waves into electrical signals. The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, phased array antennas, etc. The antenna 626 may have one or more panels designed for specific frequency bands including bands in frequency ranges 1 and 2.

The user interface 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 600.

The sensors 620 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 622 may include software and hardware elements that operate to control particular devices that are embedded in the UE 600, attached to the UE 600, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method comprising: detecting a predetermined number of consecutive out-of-sync indications; transmitting a first measurement report transmission for a measurement identity during said detecting of the predetermined number of consecutive out-of-sync indications; starting a timer and transmitting a second measurement report transmission for the measurement identity based on said detecting of the predetermined number of consecutive out-of-sync indications.

Example 2 includes the method of example 1 or some other example herein, wherein the measurement identity is associated with a reporting configuration having a T312 field set to true.

Example 3 includes the method of example 2 or some other example herein, wherein the reporting configuration includes a measurement reporting event and the method further comprises: determining that a triggering condition of the measurement reporting event is satisfied; and transmitting the second measurement report transmission based on said determining that the triggering condition is satisfied.

Example 4 includes the method of example 3 or some other example herein, wherein the triggering condition is: when a serving cell measurement is less than a threshold; when a neighboring cell measurement is greater than a primary serving cell measurement by an offset; when a primary serving cell measurement is less than a first threshold and an intra-system neighbor cell measurement is greater than a second threshold; or when a primary serving cell measurement is less than a first threshold and an inter-system neighbor cell measurement is greater than a second threshold.

Example 5 includes the method of example 1 or some other example herein, wherein the measurement identity is associated with a reporting configuration that includes a measurement reporting event, a report interval to indicate a time between successive measurement report transmissions, and a report amount to indicate a number of measurement report transmissions based on the measurement reporting event, and said retransmitting the measurement report is independent from: a number of measurement reports previously transmitted for the measurement identity based on the measurement reporting event, the report interval, or the report amount.

Example 6 includes the method of example 1 or some other example herein, wherein the timer is a T310 timer, the measurement identity is associated with a reporting configuration that is associated with a T312 configuration, and the method further comprises: starting a T312 timer based on the T312 configuration and said transmitting the second measurement report transmission.

Example 7 includes the method of example 6 or some other example herein, further comprising: detecting an expiration of the T312 timer; and initiating a radio link failure recovery procedure based on said detecting of the expiration.

Example 8 includes the method of example 1 or some other example herein, wherein the measurement identity is associated with a reporting configuration that includes a measurement reporting event and the method further comprises: determining a triggering condition of the measurement reporting event is of a type that includes a neighbor cell measurement being greater than a threshold; and transmitting the second measurement report transmission based on said determining that the triggering condition is of the type.

Example 9 includes a method comprising: starting a timer based on a predetermined number of out-of-sync indications; detecting a first measurement report transmission for a measurement identity (ID) that was transmitted during a period of time before starting the timer; transmitting a second measurement report transmission for the measurement ID based on detecting that the first measurement report transmission was transmitted during the period of time.

Example 10 includes the method of example 9 or some other example herein, further comprising: detecting the predetermined number of consecutive out-of-sync indications during the period of time.

Example 11 includes the method of example 9 or some other example herein, wherein the measurement ID is associated with a T312 reporting configuration.

Example 12 includes the method of example 9 or some other example herein, wherein the measurement ID is associated with a reporting configuration that includes a measurement reporting event and the method further comprises: determining that a triggering condition of the measurement reporting event is satisfied; and transmitting the second measurement report transmission based on said determining that the triggering condition is satisfied.

Example 13 includes the method of example 12 or some other example herein, wherein the triggering condition is: when a serving cell measurement is less than a threshold; when a neighboring cell measurement is greater than a primary serving cell measurement by an offset; when a primary serving cell measurement is less than a first threshold and an intra-system neighbor cell measurement is greater than a second threshold; or when a primary serving cell measurement is less than a first threshold and an inter-system neighbor cell measurement is greater than a second threshold.

Example 14 includes the method of example 9 or some other example herein, wherein the measurement identity is associated with a reporting configuration that includes a measurement reporting event, a report interval to indicate a time between successive measurement report transmissions, and a report amount to indicate a number of measurement report transmissions based on the measurement reporting event, and said retransmitting the measurement report is independent from: a number of measurement reports previously transmitted for the measurement identity based on the measurement reporting event, the report interval, or the report amount.

Example 15 includes the method of example 9 or some other example herein, wherein the timer is a T310 timer and the method further comprises: starting a T312 timer based on said transmitting the second measurement report transmission.

Example 16 includes the method of example 15 or some other example herein, further comprising: detecting an expiration of the T312 timer; and initiating a radio link failure recovery procedure based on said detecting of the expiration.

Example 17 includes the method of example 9 or some other example herein, wherein the measurement identity is associated with a reporting configuration that includes a measurement reporting event and the method further comprises: determining a triggering condition of the measurement reporting event is of a type that includes a neighbor cell measurement being greater than a threshold; and transmitting the second measurement report transmission based on said determining that the triggering condition is of the type.

Example 18 includes a method comprising: detecting a predetermined number of consecutive out-of-sync indications; and re-triggering a measurement report transmission for a measurement identity based on said detecting of the predetermined number of consecutive out-of-sync indications.

Example 19 includes the method of example 18, wherein the measurement identity is associated with a T312 configuration and the method further comprises: starting a T312 timer based on the T312 configuration and re-triggering of the measurement report transmission.

Example 20 includes a method comprising: storing radio link failure (RLF) timer and constant values; and detecting a predetermined number of out-of-sync indications, wherein the predetermined number is based on the RLF timer and constant values; and re-triggering a measurement report transmission for a measurement identity based on said detecting the predetermined number of out-of-sync indications.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processor circuitry to:
   detect a predetermined number of consecutive out-of-sync indications;
   output, for transmission to a network, a first measurement report transmission for a measurement identity during detection of the predetermined number of consecutive out-of-sync indications; and
   start a timer and output, for transmission to the network, a second measurement report transmission for the measurement identity based on detection of the predetermined number of consecutive out-of-sync indications.

2. The one or more non-transitory, computer-readable media of claim 1, wherein the measurement identity is associated with a reporting configuration having a T312 field set to true.

3. The one or more non-transitory, computer-readable media of claim 2, wherein the reporting configuration includes a measurement reporting event and the instructions, when executed, further cause the processor circuitry to:
   determine that a triggering condition of the measurement reporting event is satisfied; and
   output the second measurement report transmission based on determination that the triggering condition is satisfied.

4. The one or more non-transitory, computer-readable media of claim 3, wherein the triggering condition is: a serving cell measurement that is less than a threshold; a neighboring cell measurement that is greater than a primary serving cell measurement by an offset; a primary serving cell measurement that is less than a first threshold and an intra-system neighbor cell measurement that is greater than a second threshold; or a primary serving cell measurement that is less than a first threshold and an inter-system neighbor cell measurement that is greater than a second threshold.

5. The one or more non-transitory, computer-readable media of claim 1, wherein the measurement identity is associated with a reporting configuration that includes a measurement reporting event, a report interval to indicate a time between successive measurement report transmissions, and a report amount to indicate a number of measurement report transmissions based on the measurement reporting event, and transmission of the second measurement report transmission is independent from: a number of measurement reports previously transmitted for the measurement identity based on the measurement reporting event, the report interval, or the report amount.

6. The one or more non-transitory, computer-readable media of claim 1, wherein the timer is a T310 timer, the measurement identity is associated with a reporting configuration that is associated with a T312 configuration, and the instructions, when executed, further cause the processor circuitry to:
 start a T312 timer based on the T312 configuration and transmission of the second measurement report transmission.

7. The one or more non-transitory, computer-readable media of claim 6, wherein the instructions, when executed, further cause the processor circuitry to:
 detect an expiration of the T312 timer; and
 initiate a radio link failure recovery procedure based on detection of the expiration.

8. The one or more non-transitory, computer-readable media of claim 1, wherein the measurement identity is associated with a reporting configuration that includes a measurement reporting event and the instructions, when executed, further cause the processor circuitry to:
 determine a triggering condition of the measurement reporting event is of a type that includes a neighbor cell measurement being greater than a threshold; and
 output the second measurement report transmission based on determination that the triggering condition is of the type.

9. A method comprising:
 starting a timer based on a predetermined number of consecutive out-of-sync indications;
 detecting that a first measurement report transmission for a measurement identity (ID) was transmitted during a period of time before starting the timer; and
 outputting, for transmission to a network, a second measurement report transmission for the measurement ID based on detecting that the first measurement report transmission was transmitted during the period of time.

10. The method of claim 9, further comprising:
 detecting the predetermined number of consecutive out-of-sync indications during the period of time.

11. The method of claim 9, wherein the measurement ID is associated with a T312 reporting configuration.

12. The method of claim 9, wherein the measurement ID is associated with a reporting configuration that includes a measurement reporting event and the method further comprises:
 determining that a triggering condition of the measurement reporting event is satisfied; and
 outputting the second measurement report transmission based on said determining that the triggering condition is satisfied.

13. The method of claim 12, wherein the triggering condition is: a serving cell measurement that is less than a threshold; a neighboring cell measurement that is greater than a primary serving cell measurement by an offset; a primary serving cell measurement that is less than a first threshold and an intra-system neighbor cell measurement that is greater than a second threshold; or a primary serving cell measurement that is less than a first threshold and an inter-system neighbor cell measurement that is greater than a second threshold.

14. The method of claim 9, wherein the measurement identity is associated with a reporting configuration that includes a measurement reporting event, a report interval to indicate a time between successive measurement report transmissions, and a report amount to indicate a number of measurement report transmissions based on the measurement reporting event, and said transmitting the second measurement report transmission is independent from: a number of measurement reports previously transmitted for the measurement identity based on the measurement reporting event, the report interval, or the report amount.

15. The method of claim 9, wherein the timer is a T310 timer and the method further comprises:
 starting a T312 timer based on said outputting the second measurement report transmission.

16. The method of claim 15, further comprising:
 detecting an expiration of the T312 timer; and
 initiating a radio link failure recovery procedure based on said detecting of the expiration.

17. The method of claim 9, wherein the measurement identity is associated with a reporting configuration that includes a measurement reporting event and the method further comprises:
 determining a triggering condition of the measurement reporting event is of a type that includes a neighbor cell measurement being greater than a threshold; and
 outputting the second measurement report transmission based on said determining that the triggering condition is of the type.

18. An apparatus comprising:
 processing circuitry to:
  detect a predetermined number of out-of-sync indications;
  output, for transmission to a network, a first measurement report transmission for a measurement identity during detection of the predetermined number of consecutive out-of-sync indications; and
  start a timer and output, for transmission to the network, a second measurement report transmission for the measurement identity based on detection of the predetermined number of consecutive out-of-sync indications; and
 interface circuitry coupled with the processing circuitry to enable communication.

19. The apparatus of claim 18, wherein the measurement identity is associated with a T312 configuration.

20. The apparatus of claim 19, wherein the processing circuitry is further to:
 start a T312 timer based on the T312 configuration and re-triggering of the measurement report transmission.

* * * * *